(12) United States Patent
Ohta et al.

(10) Patent No.: US 9,879,129 B2
(45) Date of Patent: Jan. 30, 2018

(54) RUBBER COMPOSTION AND PNEUMATIC TIRE USING THE SAME

(75) Inventors: Fuminori Ohta, Kodaira (JP); Koji Masaki, Higashimurayama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 12/529,979

(22) PCT Filed: Mar. 5, 2008

(86) PCT No.: PCT/JP2008/053962
§ 371 (c)(1),
(2), (4) Date: Dec. 18, 2009

(87) PCT Pub. No.: WO2008/108408
PCT Pub. Date: Sep. 12, 2008

(65) Prior Publication Data
US 2011/0190440 A1  Aug. 4, 2011

(30) Foreign Application Priority Data
Mar. 6, 2007 (JP) .................. 2007-055950

(51) Int. Cl.
B60C 1/00 (2006.01)
B60C 5/14 (2006.01)
C08K 3/04 (2006.01)
C08L 7/00 (2006.01)
C08L 9/00 (2006.01)
C08K 3/00 (2006.01)
C08L 9/06 (2006.01)

(52) U.S. Cl.
CPC .............. C08L 7/00 (2013.01); B60C 1/0008 (2013.01); B60C 1/0016 (2013.01); B60C 1/0025 (2013.01); C08L 9/00 (2013.01); C08K 3/0033 (2013.01); C08L 9/06 (2013.01)

(58) Field of Classification Search
CPC ... B60C 1/0008; B60C 1/0016; B60C 1/0025; C08L 7/00; C08L 9/00; C08L 9/06
USPC ................................. 525/191, 232, 236, 237
See application file for complete search history.

(56) References Cited

U.S. PATENT DOCUMENTS

| 5,620,939 | A | 4/1997 | Halasa et al. | |
|---|---|---|---|---|
| 5,959,039 | A * | 9/1999 | Yokoyama et al. | 525/236 |
| 7,390,850 | B2 * | 6/2008 | Cook et al. | 525/191 |
| 2005/0027060 | A1 * | 2/2005 | Yagi | B60C 1/0016 |
| | | | | 524/493 |
| 2005/0119399 | A1 | 6/2005 | Nishioka et al. | |
| 2006/0052507 | A1 | 3/2006 | Minakoshi | |
| 2009/0054549 | A1 * | 2/2009 | Miyoshi | 523/150 |

FOREIGN PATENT DOCUMENTS

| EP | 0048619 A1 | 9/1981 |
|---|---|---|
| JP | 05-148389 A | 6/1993 |
| JP | 07-188461 A | 7/1995 |
| JP | 09-132609 A | 5/1997 |
| JP | 2002-121326 A | 4/2002 |
| JP | 2003-176378 A | 6/2003 |
| JP | 2004-075960 A | 3/2004 |
| JP | 2005-200598 A | 7/2005 |
| JP | 2005-225946 A | 8/2005 |
| JP | 2006-077050 A | 3/2006 |
| JP | 2006-249230 A | 9/2006 |
| WO | 2006098103 A1 | 9/2006 |
| WO | WO 2006/093048 A1 | 9/2006 |
| WO | WO 2006/093051 A1 | 9/2006 |
| WO | WO-2006098103 A1 * | 9/2006 |

OTHER PUBLICATIONS

Machine translation of JP2006-249230.*
Machine translation of JP07-188461.*
Machine translation of JP 2005-200598.*
1, 2 Polybutadiene data sheet published by JSR Corporation available online at http://www.jsr.co.jp/jsr_e/pd/images/rb_sis_3e.pdf on Jun. 18, 2011.*
Office Action dated Aug. 18, 2011 in corresponding Chinese Patent Application No. 200880013148.1.
Extended European Search Report dated Dec. 15, 2011 in corresponding International Patent Application No. PCT/JP2008/053962.
The State Intellectual Property Office of P.R. China, "Second Office Action," issued in connection with Chinese Patent Application No. 200880013148.1, dated Aug. 3, 2012.
Chinese Office Action issued in Chinese Patent Application No. 200880013148.1, dated Apr. 2, 2013.
Decision of Rejection dated Aug. 29, 2013 for Chinese Application No. 200880013148.1.
Japanese Patent Office, "Final Notification of Reasons for Refusal," issued in connection with Japanese Patent Application No. 2009-502611, dated Jul. 9, 2013.
Japanese Patent Office, "Notification of Reasons for Refusal," issued in connection with Japanese Patent Application No. 2009-502611, dated Apr. 23, 2013.
The State of Intellectual Property Office of P.R. China, "Fourth Office Action" issued in connection with Chinese Patent Application No. 200880013148.1, dated Jun. 5, 2015.

* cited by examiner

Primary Examiner — Irina S Zemel
Assistant Examiner — Jeffrey Lenihan
(74) Attorney, Agent, or Firm — Sughrue Mion, PLLC

(57) ABSTRACT

This invention provides a rubber composition being excellent in the workability during production and the heat resistance and high in the storage elastic modulus (G') and small in the loss tangent (tan δ), which is formed by compounding 1-60 parts by mass of a low-molecular weight conjugated diene-based polymer (B) having a weight average molecular weight as measured through a gel permeation chromatography and converted to polystyrene of 10,000-200,000 and a vinyl bond content in a conjugated diene compound portion of not less than 40% based on 100 parts by mass of a rubber component (A) comprised of at least one selected from the group consisting of natural rubber, polyisoprene rubber, styrene-butadiene copolymer rubber, polybutadiene rubber and isobutylene isoprene rubber, wherein the rubber component (A) comprises natural rubber and/or polyisoprene rubber and a proportion of styrene units in total of the low-molecular weight conjugated diene-based polymer (B) is less than 5% by mass.

9 Claims, No Drawings

RUBBER COMPOSTION AND PNEUMATIC TIRE USING THE SAME

CROSS REFERENCE TO RELATED APPLICATION

This application is a National Stage of International Application No. PCT/JP2008/053962 filed Mar. 5, 2008, claiming priority based on Japanese Patent Application No. 2007-055950, filed Mar. 6, 2007, the contents of all of which are incorporated herein by reference in their entirety.

TECHNICAL FIELD

This invention relates to a rubber composition and a tire using the rubber composition, and more particularly to a rubber composition which is excellent in the workability during production and the heat resistance, high in the storage elastic modulus (G') and small in the loss tangent (tan δ).

BACKGROUND ART

In general, when the rubber composition is exposed to a higher temperature during the vulcanization of the rubber composition or in the actual use as a vulcanized rubber for tires and the like, crosslinked portions among rubber segments mainly formed by the vulcanization are broken to bring about the deterioration of rubber. As means for improving a resistance to rubber deterioration in the exposure to the higher temperature (heat resistance) is effective a technique of making a structure of the crosslinked portion among rubber segments to a bond having a large dissociation energy. Concretely, there is mentioned a technique of reducing an amount of sulfur compounded and increasing an amount of a vulcanization accelerator compounded (so-called EV system) because the heat resistance of the crosslinked portion is increased in the order from polysulfide bond (CSx-C) through disulfide bond (C—S—S—C) to monosulfide bond (C—S—C). In this technique, however, the heat resistance of rubber is improved, but the bonding length in the crosslinked portion among rubber segments becomes short and there is a problem of deteriorating an elongation at break (Eb) or a tenacity at break (Tb).

In connection with the trend of worldwide regulation on the discharge of carbon dioxide associated with the escalation in interest on recent environmental issues, a demand on low fuel consumption of vehicles is strongly increasing. In order to cope with such a demand, it is required to reduce the rolling resistance as a tire performance. As a technique for reducing the rolling resistance of the tire, it is effective to use a rubber composition having a lower loss tangent (tan δ) and a low heat buildup as a rubber composition applied to a tread portion of the tire.

On the other hand, a rubber composition having a high storage elastic modulus (G') is suitable as a rubber composition applied to a tread portion, a sidewall portion, a bead filler and the like in the tire, so that it is required to develop a rubber composition having a low loss tangent (tan δ) and a high storage elastic modulus (G'). As means for increasing the storage elastic modulus (G') of the rubber composition, there are known a technique of increasing an amount of carbon black compounded in the rubber composition, a technique of compounding bismaleimide (BMI) with a particular structure such as N,N'-(4,4'-diphenylmethane)-bismaleimide or the like as disclosed in JP-A-2002-121326, and a technique of compounding a compound having a reactive group to a rubber component and an adsorption group to a filler such as polyethylene glycol dimaleate (PEGM) or the like as disclosed in JP-A-2003-176378.

However, when the amount of carbon black compounded in the rubber composition is increased, the storage elastic modulus (G') of the rubber composition can be improved, but the loss tangent (tan δ) of the rubber composition is simultaneously increased to deteriorate the low heat buildup of the rubber composition, and further the Mooney viscosity of the rubber composition is increased to deteriorate the processability.

When the compound having a reactive group to bismaleimide (BMI) or a rubber component and an adsorption group to a filler is compounded into the rubber composition, the storage elastic modulus (G') of the rubber composition can be improved, the loss tangent (tan δ) of the rubber composition is substantially equal to that of the rubber composition having no compound and hence the low heat buildup of the rubber composition can not be improved sufficiently.

DISCLOSURE OF THE INVENTION

It is, therefore, an object of the invention to solve the above-mentioned problems of the conventional techniques and to provide a rubber composition which is excellent in the workability during production and the heat resistance, high in the storage elastic modulus (G') and small in the loss tangent (tan δ). Also, it is another object of the invention to provide a pneumatic tire using such a rubber composition in at least any one of a tread portion, a sidewall portion, an innerliner, a ply-coating rubber and a bead filler.

The inventors have made various studies in order to achieve the above objects and discovered that a low-molecular weight conjugated diene-based polymer having specified weight average molecular weight and vinyl bond content and suppressing a proportion of styrene units contained to less than a certain value is compounded into a specified rubber component instead of a part or a whole of a softening agent commonly used in a rubber composition, whereby the storage elastic modulus (G') is improved and the loss tangent (tan δ) is reduced and further the heat resistance can be improved without deteriorating the workability of the rubber composition, and as a result the invention has been accomplished.

That is, the rubber composition according to the invention is characterized by compounding 1-60 parts by mass of a low-molecular weight conjugated diene-based polymer (B) having a weight average molecular weight as measured through a gel permeation chromatography and converted to polystyrene of 10,000-200,000 and a vinyl bond content in a conjugated diene compound portion of not less than 40% based on 100 parts by mass of a rubber component (A) comprised of at least one selected from the group consisting of natural rubber, polyisoprene rubber, styrene-butadiene copolymer rubber, polybutadiene rubber and isobutylene isoprene rubber, wherein the rubber component (A) comprises natural rubber and/or polyisoprene rubber, and a proportion of styrene units in total of the low-molecular weight conjugated diene-based polymer (B) is less than 5% by mass.

In the rubber composition according to the invention, the rubber component (A) is preferable to have a weight average molecular weight as measured through a gel permeation chromatography and converted to polystyrene of more than 200,000.

In the rubber composition according to the invention, the low-molecular weight conjugated diene-based polymer (B) has preferably a weight average molecular weight as measured through a gel permeation chromatography and converted to polystyrene of 20,000-200,000, more preferably 30,000-150,000.

In a preferable embodiment of the rubber composition according to the invention, a proportion of styrene units in total of the rubber component (A) is less than 30% by mass.

In another preferable embodiment of the rubber composition according to the invention, the low-molecular weight conjugated diene-based polymer (B) is polybutadiene and/or polyisoprene. At this moment, the low-molecular weight conjugated diene-based polymer (B) is preferably polybutadiene.

In the other preferable embodiment of the rubber composition according to the invention, carbon black or silica is further compounded.

Also, the pneumatic tire according to the invention is characterized by using the aforementioned rubber composition in at least any one of a tread portion, a sidewall portion, an innerliner, a ply-coating rubber and a bead filler.

According to the invention, there can be provided a rubber composition being excellent in the workability during production and the heat resistance, high in the storage elastic modulus (G') and small in the loss tangent (tan δ) by using a low-molecular weight conjugated diene-based polymer having specified vinyl bond content and weight average molecular weight and suppressing a proportion of styrene units contained to less than a certain value. Also, there can be provided a pneumatic tire using such a rubber composition in at least any one of a tread portion, a sidewall portion, an innerliner, a ply-coating rubber and a bead filler.

BEST MODE FOR CARRYING OUT THE INVENTION

The invention will be described in detail below. The rubber composition according to the invention is characterized by compounding 1-60 parts by mass of a low-molecular weight conjugated diene-based polymer (B) having a weight average molecular weight as measured through a gel permeation chromatography and converted to polystyrene of 10,000-200,000 and a vinyl bond content in a conjugated diene compound portion of not less than 40% based on 100 parts by mass of a rubber component (A) comprised of at least one selected from the group consisting of natural rubber, polyisoprene rubber, styrene-butadiene copolymer rubber, polybutadiene rubber and isobutylene isoprene rubber,
wherein the rubber component (A) comprises natural rubber and/or polyisoprene rubber, and
a proportion of styrene units in total of the low-molecular weight conjugated diene-based polymer (B) is less than 5% by mass.

In general, a diene-based rubber containing a double bond in its main chain such as natural rubber, polyisoprene rubber or the like as a rubber component (A) is easily broken at a higher temperature and is low in the heat resistance. However, the rubber composition according to the invention is compounded with the low-molecular weight conjugated diene-based polymer (B) having a high vinyl bond content in the conjugated diene compound portion, so that there are effects in which a crosslinked sulfur broken by exposing to a higher temperature forms re-crosslinking with carbon in an allyl site existing in the side chain of the low-molecular weight conjugated diene-based polymer (B), and so on.

Therefore, the re-crosslinking of the low-molecular weight conjugated diene-based polymer (B) with the crosslinked sulfur can maintain a three-dimensional network structure to improve the heat resistance of the rubber composition. Also, the inventors have made studies and found that when the low-molecular weight conjugated diene-based polymer (B) having a weight average molecular weight as measured through a gel permeation chromatography and converted to polystyrene of 10,000-200,000, a vinyl bond content in a conjugated diene compound portion of not less than 40% and a proportion of styrene units in total thereof of less than 5% by mass is compounded into a rubber composition instead of a part or a whole of a softening agent included in the compounding, the storage elastic modulus (G') is improved and the loss tangent (tan δ) can be reduced without deteriorating the workability of the rubber composition.

The rubber component (A) in the rubber composition according to the invention is at least one selected from the group consisting of natural rubber, polyisoprene rubber (IR), styrene-butadiene copolymer rubber (SBR), polybutadiene rubber (BR) and isobutylene isoprene rubber (IIR) and is required to comprise at least natural rubber and/or polyisoprene rubber. When the rubber component (A) comprises styrene-butadiene copolymer rubber, a proportion of styrene units in total of the rubber component (A) is preferably less than 30% by mass, more preferably less than 20% by mass, even preferably less than 15% by mass. When the proportion of styrene units in total of the rubber component (A) is less than 30% by mass, the rubber component (A) is excellent in the compatibility with the low-molecular weight conjugated diene-based polymer (B). Consequently, the fracture strength of the rubber composition is increased and the effects of improving the storage elastic modulus (G') and of reducing the loss tangent (tan δ) can be stably obtained. In addition, when the low-molecular weight conjugated diene-based polymer (B) comprises styrene-butadiene copolymer, a proportion of styrene units in total of the low-molecular weight conjugated diene-based polymer (B) is required to be less than 5% by mass. Moreover, the rubber component (A) may be used alone or in a blend of two or more.

The rubber component (A) of the rubber composition according to the invention is preferable to have a weight average molecular weight as measured through a gel permeation chromatography and converted to polystyrene of more than 200,000. When the weight average molecular weight as converted to polystyrene is not more than 200,000, there is a fear of deteriorating the fracture properties of the rubber composition.

The rubber composition according to the invention is required to comprise 1-60 parts by mass, preferably 5-50 parts by mass, more preferably 5-40 parts by mass of the low-molecular weight conjugated diene-based polymer (B) having a weight average molecular weight as measured through a gel permeation chromatography and converted to polystyrene of 10,000-200,000, a vinyl bond content in a conjugated diene compound portion of not less than 40% and a proportion of styrene units in total thereof of less than 5% by mass based on 100 parts by mass of the rubber component (A). When the amount of the low-molecular weight conjugated diene-based polymer (B) is less than 1 part by mass, the effect of imparting the workability to the rubber composition is weak, while when it exceeds 60 parts by mass, there is a tendency of deteriorating the fracture properties of the vulcanized rubber.

The low-molecular weight conjugated diene-based polymer (B) is required to have a weight average molecular weight as measured through a gel permeation chromatography and converted to polystyrene of 10,000-200,000, preferably 20,000-200,000, more preferably 30,000-150,000, even preferably 30,000-100,000. When the weight average molecular weight as converted to polystyrene is less than 10,000, the effect of improving the heat resistance is not obtained, while when it exceeds 200,000, the workability of the rubber composition is deteriorated.

The low-molecular weight conjugated diene-based polymer (B) is required to have a vinyl bond content in a conjugated diene compound portion of not less than 40%, preferably not less than 45%, more preferably not less than 50%. When the vinyl bond content in the conjugated diene compound portion is not less than 40%, the effect of improving the heat resistance is obtained. While, when the vinyl bond content in the conjugated diene compound portion is less than 40%, it is difficult to ensure the heat resistance of the rubber composition.

The low-molecular weight conjugated diene-based polymer (B) is not particularly limited as long as it has the specified weight average molecular weight and vinyl bond content in the conjugated diene compound portion and suppresses the proportion of styrene units contained to less than a certain value, but it is preferably a homopolymer of a conjugated diene compound or a copolymer of an aromatic vinyl compound and a conjugated diene compound. As the conjugated diene compound as a monomer are mentioned 1,3-butadiene, isoprene, 1,3-pentadiene, 2,3-dimethylbutadiene, 2-phenyl-1,3-butadiene, 1,3-hexadiene and so on. Among them, 1,3-butadiene and isoprene are preferable. On the other hand, as the aromatic vinyl compound as a monomer are mentioned styrene, p-methylstyrene, m-methylstyrene, p-tert-butyl styrene, α-methylstyrene, chloromethyl styrene, vinyl toluene and so on. Therefore, as the low-molecular weight conjugated diene-based polymer (B) are preferable polybutadiene and/or polyisoprene, and polybutadiene is more preferable. Moreover, these monomers may be used alone or in a combination of two or more.

When the low-molecular weight conjugated diene-based polymer (B) is an aromatic vinyl compound-conjugated diene compound copolymer, the amount of the aromatic vinyl compound bonded is preferably less than 5% by mass. When the amount of the aromatic vinyl compound bonded is not less than 5% by mass, the compatibility with the rubber component (A), particularly the rubber component (A) having the proportion of styrene units in total thereof of less than 30% by mass, for example, natural rubber (NR) or polyisoprene rubber (IR) is deteriorated and sufficient heat resistance and fracture properties can not be obtained.

The low-molecular weight conjugated diene-based polymer (B) is not particularly limited, but it can be obtained, for example, by polymerizing a conjugated diene compound alone as a monomer or a mixture of an aromatic vinyl compound and a conjugated diene compound as monomers in a hydrocarbon solvent inactive to a polymerization reaction. In case of introducing at least one functional group in the molecule of the low-molecular weight conjugated diene-based polymer (B), it can be attained by (1) a method wherein the monomer(s) is (co)polymerized with a polymerization initiator to produce a (co)polymer having a polymerization active site and then the polymerization active site is modified with various modifying agents, or (2) a method of (co)polymerizing the monomer(s) with a polymerization initiator having a functional group, for example, a polymerization initiator having Sn—Li, C—Li or N—Li bond.

As the polymerization initiator used for the synthesis of the polymer (B) is preferable a lithium compound, and further a hydrocarbyl lithium and a lithium amide compound are preferable. When the lithium compound is used as the polymerization initiator, the aromatic vinyl compound and the conjugated diene compound are polymerized through an anionic polymerization. When the hydrocarbyl lithium is used as the polymerization initiator, there is obtained a polymer having a hydrocarbyl group at a polymerization starting terminal and a polymerization active site at another terminal. On the other hand, when the lithium amide compound is used as the polymerization initiator, there is obtained a polymer having a nitrogen-containing functional group at a polymerization starting terminal and a polymerization active site at another terminal, which can be used as the low-molecular weight conjugated diene-based polymer (B) having at least one functional group in the invention without being modified with a modifying agent. Moreover, the amount of the polymerization initiator used is preferably within a range of 0.2-20 mmol per 100 g of the monomer.

As the hydrocarbyl lithium are mentioned ethyl lithium, n-propyl lithium, isopropyl lithium, n-butyl lithium, sec-butyl lithium, tert-octyl lithium, n-decyl lithium, phenyl lithium, 2-naphthyl lithium, 2-butyl-phenyl lithium, 4-phenyl-butyl lithium, cyclohexyl lithium, cyclopentyl lithium, a reaction product of diisopropenylbenzene and butyl lithium and so on. Among them, alkyl lithiums such as ethyl lithium, n-propyl lithium, isopropyl lithium, n-butyl lithium, sec-butyl lithium, tert-octyl lithium, n-decyl lithium and so on are preferable, and n-butyl lithium is particularly preferable.

The method for producing the conjugated diene-based polymer with the above polymerization initiator is not particularly limited as mentioned above. For example, the polymer (B) can be produced by polymerizing the monomer(s) in a hydrocarbon solvent inactive to the polymerization reaction. As the hydrocarbon solvent inactive to the polymerization reaction are mentioned propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene and so on. They may be used alone or in a combination of two or more.

The polymerization reaction is required to be carried out in the presence of a randomizer. The randomizer can control the microstructure of the conjugated diene compound portion in the (co)polymer, and more concretely has an action of controlling the vinyl bond content of the conjugated diene compound portion in the (co)polymer, randomizing the conjugated diene compound unit and aromatic vinyl compound unit in the copolymer, or the like. As the randomizer are mentioned dimethoxybenzene, tetrahydrofuran, dimethoxyethane, diethylene glycol dibutyl ether, diethylene glycol dimethyl ether, bistetrahydrofuryl propane, triethylamine, pyridine, N-methylmorpholine, N,N,N',N'-tetramethyl ethylenediamine, 1,2-dipiperidinoethane, potassium-t-amylate, potassium-t-butoxide, sodium-t-amylate and so on. The amount of the randomizer used is preferably within a range of 0.1-100 molar equivalent per 1 mole of the polymerization initiator.

The anionic polymerization is preferably carried out through a solution polymerization. The concentration of the monomer in the polymerization reaction solution is preferably within a range of 5-50% by mass, more preferably 10-30% by mass. Moreover, when the conjugated diene compound and the aromatic vinyl compound are used together, the content of the aromatic vinyl compound in the mixture of the monomers can be properly selected depending on the aromatic vinyl compound content of the target copolymer. Also, the polymerization system is not particularly limited and may be a batch system or a continuous system.

The polymerization temperature in the anionic polymerization is preferably within a range of 0-150° C., more preferably 20-130° C. Also, the polymerization may be carried out under a generating pressure, but it is preferable to be usually conducted under a pressure enough to keep the monomers used at substantially a liquid phase. When the polymerization reaction is carried out under a pressure higher than the generating pressure, the reaction system is preferable to be pressurized with an inert gas. Moreover, the starting materials used in the polymerization such as the monomers, polymerization initiator, solvent and the like are preferable to be used after the reaction obstructing substances such as water, oxygen, carbon dioxide, protonic compound and the like are previously removed.

When the polymerization active site of the (co)polymer having the polymerization active site is modified with a modifying agent, a nitrogen-containing compound, a silicon-containing compound and a tin-containing compound are preferably used as the modifying agent. In this case, a nitrogen-containing functional group, a silicon-containing functional group or a tin-containing functional group can be introduced through the modification reaction.

The modification reaction of the polymerization active site with the modifying agent is preferable to be carried out by a solution reaction. In such a solution may be included the monomer(s) used in the polymerization. Also, the reaction system of the modification reaction is not particularly limited and may be a batch system or a continuous system. Further, the reaction temperature of the modification reaction is not particularly limited as long as the reaction proceeds, and the reaction temperature in the polymerization reaction may be adopted as it is. The amount of the modifying agent used is preferably within a range of 0.25-3.0 mol, more preferably 0.5-1.5 mol per 1 mol of the polymerization initiator used for the production of the (co)polymer.

In the invention, the reaction solution containing the polymer (B) may be dried to separate the polymer (B) and then the resulting polymer (B) may be compounded into the rubber component (A), or the reaction solution containing the polymer (B) may be mixed with a rubber cement of the rubber component (A) at a solution state and then dried to obtain the mixture of the rubber component (A) and the polymer (B).

In the rubber composition according to the invention, it is more preferable to compound a filler in an amount of 30-90 parts by mass based on 100 parts by mass of the rubber component (A). When the amount of the filler compounded is less than 30 parts by mass, the fracture properties and wear resistance of the vulcanized rubber are insufficient, while when it exceeds 90 parts by mass, the workability tends to be deteriorated. As the filler are preferable carbon black and silica. Moreover, as the carbon black are preferable FEF, SRF, HAF, ISAF and SAF grade carbon blacks, and HAF, ISAF and SAF grade carbon blacks are more preferable. On the other hand, as the silica are preferable precipitated silica, fumed silica and the like, and the precipitated silica is more preferable. These reinforcing fillers may be used alone or in a combination of two or more.

The rubber composition according to the invention may further contain a softening agent. As the softening agent are mentioned process oils such as a paraffinic oil, a naphthenic oil, an aromatic oil and so on. The aromatic oil is preferable in view of the fracture properties and wear resistance, and the naphthenic oil and paraffinic oil are preferable in view of the low heat build-up and low-temperature characteristics. The amount of the softening agent compounded is not particularly limited, but a total amount of the low-molecular weight conjugated diene-based polymer (B) and the softening agent compounded is preferable to be 1-80 parts by mass based on 100 parts by mass of the rubber component (A). When the total amount of the low-molecular weight conjugated diene-based polymer (B) and the softening agent compounded exceeds 80 parts by mass, the fracture properties of the vulcanized rubber tend to be deteriorated.

The rubber composition according to the invention can be properly compounded with additives usually used in the rubber industry such as an antioxidant, a silane coupling agent, a vulcanization accelerator, an accelerator activator, a vulcanizing agent and the like within a scope of not damaging the object of the invention in addition to the above rubber component (A), low-molecular weight conjugated diene-based polymer (B), filler and softening agent. As these additives can be preferably used commercially available ones. The rubber composition can be produced by compounding the rubber component (A) with the low-molecular weight conjugated diene-based polymer (B), and, if necessary, the properly selected various additives and milling, warming, extruding and so on.

The pneumatic tire according to the invention is characterized by using the aforementioned rubber composition in at least any one of a tread portion, a sidewall portion, an innerliner, a ply-coating rubber and a bead filler. The tire using the rubber composition in at least any one of a tread portion, a sidewall portion, an innerliner, a ply-coating rubber and a bead filler is excellent in the workability during production, heat resistance, low fuel consumption and steering stability. The pneumatic tire according to the invention is not particularly limited as long as the above rubber composition is used in at least any one of a tread portion, a sidewall portion, an innerliner, a ply-coating rubber and a bead filler, and can be produced by the usual method. Moreover, as a gas filled into the tire can be used usual air or air having a regulated partial oxygen pressure but also inert gases such as nitrogen, argon, helium and so on.

EXAMPLES

The following examples are given in illustration of the invention and are not intended as limitations thereof.

Production Example of Polymer (B-1)

Into a pressure glass vessel of 800 mL dried and replaced with nitrogen are charged 300 g of cyclohexane, 40 g of 1,3-butadiene and 0.16 mmol of ditetrahydrofurylpropane, and further 1.32 mmol of n-butyl lithium (n-BuLi) is added thereto and then polymerization reaction is conducted at 50° C. for 1.5 hours. In this case, the polymerization conversion is approximately 100%. Thereafter, 0.5 mL of a solution of 2,6-di-t-butyl-p-cresol (BHT) in isopropanol (BHT concentration: 5% by mass) is added to the polymerization system to stop the polymerization reaction and further the drying is carried out according to a usual manner to obtain a polymer (B-1).

Production Example of Polymer (B-2)

Into a pressure glass vessel of 800 mL dried and replaced with nitrogen are charged 300 g of cyclohexane, 40 g of 1,3-butadiene, 10 g of styrene and 0.53 mmol of ditetrahydrofurylpropane, and further 1.32 mmol of n-butyl lithium (n-BuLi) is added thereto and then the polymerization reaction is conducted at 50° C. for 1.5 hours. In this case, the polymerization conversion is approximately 100%. Thereafter, 0.5 mL of a solution of 2,6-di-t-butyl-p-cresol (BHT)

in isopropanol (BHT concentration: 5% by mass) is added to the polymerization system to stop the polymerization reaction and further the drying is carried out according to a usual manner to obtain a polymer (B-2).

Production Example of Polymer (B-3)

Into a pressure glass vessel of 800 mL dried and replaced with nitrogen are charged 300 g of cyclohexane, 40 g of 1,3-butadiene and 0.53 mmol of ditetrahydrofurylpropane, and further 1.32 mmol of n-butyl lithium (n-BuLi) is added thereto and then the polymerization reaction is conducted at 50° C. for 1.5 hours. In this case, the polymerization conversion is approximately 100%. Thereafter, 0.5 mL of a solution of 2,6-di-t-butyl-p-cresol (BHT) in isopropanol (BHT concentration: 5% by mass) is added to the polymerization system to stop the polymerization reaction and further the drying is carried out according to a usual manner to obtain a polymer (B-3).

Production Example of Polymer (B-4)

Into a pressure glass vessel of 800 mL dried and replaced with nitrogen are charged 300 g of cyclohexane, 40 g of 1,3-butadiene and 0.79 mmol of ditetrahydrofurylpropane, and further 1.32 mmol of n-butyl lithium (n-BuLi) is added thereto and then the polymerization reaction is conducted at 50° C. for 1.5 hours. In this case, the polymerization conversion is approximately 1.00%. Thereafter, 0.5 mL of a solution of 2,6-di-t-butyl-p-cresol (BHT) in isopropanol (BHT concentration: 5% by mass) is added to the polymerization system to stop the polymerization reaction and further the drying is carried out according to a usual manner to obtain a polymer (B-4).

Production Example of Polymers (B-5)-(B-11) and (B-17)

Polymers (B-5)-(B-11) and (B-17) are synthesized in the same manner as in Production Example of Polymer (B-3) except that the amount of n-butyl lithium (n-BuLi) used is changed.

Production Example of Polymers (B-12)-(B-13)

Polymers (B-12)-(B-13) are synthesized in the same manner as in Production Example of Polymer (B-1) except that the amount of ditetrahydrofurylpropane used is changed.

Production Example of Polymers (B-14)-(B-15)

Polymers (B-14)-(B-15) are synthesized in the same manner as in Production Example of Polymer (B-2) except that the amount of 1,3-butadiene and styrene used is changed.

Production Example of Polymer (B-16)

A polymer (B-16) is synthesized in the same manner as in Production Example of Polymer (B-4) except that isoprene is used instead of 1,3-butadiene and the amount of ditetrahydrofurylpropane used is changed from 0.79 mmol to 0.026 mmol and the polymerization reaction is conducted for 7 hours.

The weight average molecular weight (Mw) and microstructure of the polymers (B-1)-(B-17) produced as mentioned above are measured according to the following methods. The results are shown in Table 1.

(1) Weight Average Molecular Weight (Mw)

The weight average molecular weight (Mw) of each polymer as converted to polystyrene is measured through a gel permeation chromatography [GPC: HLC-8020 manufactured by TOSOH, column: GMH-XL (two series columns) manufactured by TOSOH, detector: differential refractometer (RI)] as a standard of monodisperse polystyrene.

(2) Microstructure

The microstructure of the polymer is determined by an infrared method (Morello method).

TABLE 1

|  | Weight average molecular weight (Mw) ($\times 10^3$) | Bound styrene content (% by mass) | Vinyl bond content (%) |
|---|---|---|---|
| Polymer (B-1) | 80 | 0 | 35 |
| Polymer (B-2) | 80 | 20 | 45 |
| Polymer (B-3) | 80 | 0 | 45 |
| Polymer (B-4) | 80 | 0 | 55 |
| Polymer (B-5) | 3 | 0 | 45 |
| Polymer (B-6) | 10 | 0 | 45 |
| Polymer (B-7) | 25 | 0 | 45 |
| Polymer (B-8) | 40 | 0 | 45 |
| Polymer (B-9) | 120 | 0 | 45 |
| Polymer (B-10) | 180 | 0 | 45 |
| Polymer (B-11) | 220 | 0 | 45 |
| Polymer (B-12) | 80 | 0 | 40 |
| Polymer (B-13) | 80 | 0 | 50 |
| Polymer (B-14) | 80 | 3 | 45 |
| Polymer (B-15) | 80 | 7 | 45 |
| Polymer (B-16) | 80 | 0 | 45 |
| Polymer (B-17) | 100 | 0 | 45 |

Then, a rubber composition having a compounding recipe as shown in Tables 2-6 is prepared and the Mooney viscosity [ML1+4 (130° C.)] and heat resistance of the rubber composition are measured according to the following methods. Further, the rubber composition is vulcanized on usual conditions to obtain a vulcanized rubber, and the storage elastic modulus (G'), loss tangent (tan δ) and fracture strength of the thus vulcanized rubber are measured according to the following methods. The results are shown in Tables 2-6.

(3) Mooney Viscosity

The Mooney viscosity [ML1+4 (130° C.)] is measured at 130° C. according to JIS K 6300-1: 2001, and represented by an index on the basis that the Mooney viscosity in the rubber compositions of Comparative Examples 1 and 7 is 100 in Tables 2-5, the Mooney viscosity in the rubber composition of Comparative Example 11 is 100 for Example 20 and Comparative Example 11 in Table 6, the Mooney viscosity in the rubber composition of Comparative Example 12 is 100 for Example 21 and Comparative Example 12 in Table 6, the Mooney viscosity in the rubber composition of Comparative Example 13 is 100 for Example 22 and Comparative Example 13 in Table 6, and the Mooney viscosity in the rubber composition of Comparative Example 14 is 100 for Example 23 and Comparative Example 14 in Table 6. The smaller the index value, the better the workability.

(4) Heat Resistance (Vulcanization Reversion)

The torque of the rubber composition is measured by using a rheometer at 175° C. for 15 minutes to evaluate a vulcanization reversion according to the following equation, which is represented by an index on the basis that an inverse number of the vulcanization reversion in the rubber compositions of Comparative Examples 1 and 7 is 100 in Tables 2-5, an inverse number of the vulcanization reversion in the rubber composition of Comparative Example 11 is 100 for Example 20 and Comparative Example 11 in Table 6, an inverse number of the vulcanization reversion in the rubber composition of Comparative Example 12 is 100 for Example 21 and Comparative Example 12 in Table 6, an inverse number of the vulcanization reversion in the rubber composition of Comparative Example 13 is 100 for Example 22 and Comparative Example 13 in Table 6, and an inverse number of the vulcanization reversion in the rubber composition of Comparative Example 14 is 100 for Example 23 and Comparative Example 14 in Table 6. The larger the index value, the better the heat resistance.

Vulcanization reversion(%)=[($F$max−$F$)/($F$max−$F$min)]×100

In the equation, Fmax represents the maximum value of torque, Fmin represents the minimum value of torque, and F represents a value of torque after 15 minutes of the measurement.

(5) Storage Elastic Modulus (G') and Loss Tangent (tan δ)

The storage elastic modulus (G') and loss tangent (tan δ) are measured at a temperature of 50° C., a frequency of 15 Hz and a strain of 5% by using a viscoelasticity measuring device manufactured by RHEOMETRICS Corporation, and represented by an index on the basis that the storage elastic modulus (G') and loss tangent (tan δ) in the rubber compositions of Comparative Examples 1 and 7 are each 100 in Tables 2-5, the storage elastic modulus (G') and loss tangent (tan δ) in the rubber composition of Comparative Example 11 are each 100 for Example 20 and Comparative Example 11 in Table 6, the storage elastic modulus (G') and loss tangent (tan δ) in the rubber composition of Comparative Example 12 are each 100 for Example 21 and Comparative Example 12 in Table 6, the storage elastic modulus (G') and loss tangent (tan δ) in the rubber composition of Comparative Example 13 are each 100 for Example 22 and Comparative Example 13 in Table 6, and the storage elastic modulus (G') and loss tangent (tan δ) in the rubber composition of Comparative Example 14 are each 100 for Example 23 and Comparative Example 14 in Table 6. With respect to the storage elastic modulus (G'), the lager the index value, the higher the storage elastic modulus. With respect to the loss tangent (δ), the smaller the index value, the better the low heat buildup.

(6) Fracture Strength

A JIS No. 3 dumbbell specimen is prepared and a tensile test is conducted according to JIS K 6251-1993 to measure the fracture strength of the rubber composition, which is represented by an index on the basis that the fracture strength in the rubber compositions of Comparative Examples 1 and 7 is 100 in Tables 2-5, the fracture strength in the rubber composition of Comparative Example 11 is 100 for Example 20 and Comparative Example 11 in Table 6, the fracture strength in the rubber composition of Comparative Example 12 is 100 for Example 21 and Comparative Example 12 in Table 6, the fracture strength in the rubber composition of Comparative Example 13 is 100 for Example 22 and Comparative Example 13 in Table 6, and the fracture strength in the rubber composition of Comparative Example 14 is 100 for Example 23 and Comparative Example 14 in Table 6. The larger the index value, the better the fracture strength.

TABLE 2

| | | | | Comparative Example 1 | Comparative Example 2 | Comparative Example 3 | Comparative Example 4 | Example 1 | Example 2 | Comparative Example 5 |
|---|---|---|---|---|---|---|---|---|---|---|
| Type of low-molecular weight conjugated diene-based polymer (B) | | | | — | — | B-1 | B-2 | B-3 | B-4 | B-5 |
| Compounding | Rubber component (A) | Natural rubber *1 | parts by mass | 60 | 60 | 60 | 60 | 60 | 60 | 60 |
| | | Butadiene rubber *2 | | 40 | 40 | 40 | 40 | 40 | 40 | 40 |
| | Low-molecular weight conjugated diene-based polymer (B) | | | — | — | 10 | 10 | 10 | 10 | 10 |
| | Aromatic oil | | | 5 | 15 | 5 | 5 | 5 | 5 | 5 |
| | Carbon black (N220) | | | 60 | 60 | 60 | 60 | 60 | 60 | 60 |
| | Stearic acid | | | 1.5 | 1.5 | 1.5 | 1.5 | 1.5 | 1.5 | 1.5 |
| | Zinc white | | | 1.5 | 1.5 | 1.5 | 1.5 | 1.5 | 1.5 | 1.5 |
| | Antioxidant 6C *3 | | | 1 | 1 | 1 | 1 | 1 | 1 | 1 |
| | Vulcanization accelerator DM *4 | | | 0.2 | 0.2 | 0.2 | 0.2 | 0.2 | 0.2 | 0.2 |
| | Vulcanization accelerator CZ *5 | | | 0.5 | 0.5 | 0.5 | 0.5 | 0.5 | 0.5 | 0.5 |
| | Sulfur | | | 1 | 1 | 1 | 1 | 1 | 1 | 1 |
| Physical properties | Workability [$ML_{1+4}$ (130° C.)] (index) | | | 100 | 78 | 91 | 90 | 92 | 91 | 78 |
| | Loss tangent (tan δ) (index) | | | 100 | 118 | 87 | 96 | 85 | 84 | 114 |
| | Storage elastic modulus (G') (index) | | | 100 | 86 | 114 | 116 | 115 | 118 | 88 |
| | Heat resistance (vulcanization reversion) (index) | | | 100 | 88 | 105 | 118 | 139 | 145 | 95 |
| | Fracture strength (index) | | | 100 | 82 | 102 | 91 | 130 | 137 | 93 |

TABLE 3

| | | | | Example 3 | Example 4 | Example 5 | Example 6 | Example 7 | Comparative Example 6 |
|---|---|---|---|---|---|---|---|---|---|
| Type of low-molecular weight conjugated diene-based polymer (B) | | | | B-6 | B-7 | B-8 | B-9 | B-10 | B-11 |
| Compounding | Rubber component (A) | Natural rubber *1 | parts by mass | 60 | 60 | 60 | 60 | 60 | 60 |
| | | Butadiene rubber *2 | | 40 | 40 | 40 | 40 | 40 | 40 |
| | Low-molecular weight conjugated diene-based polymer (B) | | | 10 | 10 | 10 | 10 | 10 | 10 |
| | Aromatic oil | | | 5 | 5 | 5 | 5 | 5 | 5 |

TABLE 3-continued

|  |  | Example 3 | Example 4 | Example 5 | Example 6 | Example 7 | Comparative Example 6 |
|---|---|---|---|---|---|---|---|
|  | Carbon black (N220) | 60 | 60 | 60 | 60 | 60 | 60 |
|  | Stearic acid | 1.5 | 1.5 | 1.5 | 1.5 | 1.5 | 1.5 |
|  | Zinc white | 1.5 | 1.5 | 1.5 | 1.5 | 1.5 | 1.5 |
|  | Antioxidant 6C *3 | 1 | 1 | 1 | 1 | 1 | 1 |
|  | Vulcanization accelerator DM *4 | 0.2 | 0.2 | 0.2 | 0.2 | 0.2 | 0.2 |
|  | Vulcanization accelerator CZ *5 | 0.5 | 0.5 | 0.5 | 0.5 | 0.5 | 0.5 |
|  | Sulfur | 1 | 1 | 1 | 1 | 1 | 1 |
| Physical properties | Workability [ML$_{1+4}$ (130° C.)] (index) | 80 | 82 | 86 | 97 | 103 | 112 |
|  | Loss tangent (tan δ) (index) | 103 | 96 | 92 | 83 | 86 | 95 |
|  | Storage elastic modulus (G') (index) | 98 | 103 | 109 | 114 | 116 | 115 |
|  | Heat resistance (vulcanization reversion) (index) | 104 | 109 | 124 | 131 | 124 | 115 |
|  | Fracture strength (index) | 100 | 109 | 116 | 127 | 120 | 114 |

*1 Weight average molecular weight as converted to polystyrene = 1,500,000.
*2 BR01 manufactured by JSR Corporation, weight average molecular weight as converted to polystyrene = 550,000.
*3 N-(1,3-dimethylbutyl)-N'-phenyl-p-phenylenediamine.
*4 di-2-benzothiazolyl disulfide.
*5 N-cyclohexyl-2-benzothiazoly sulfenamide.

As seen from Tables 2-3, the rubber compositions of Examples 1-7 using the low-molecular weight conjugated diene-based polymer (B) having a weight average molecular weight of 10,000-200,000, a vinyl bond content in a conjugated diene compound portion of not less than 40% and a proportion of styrene units in total thereof of less than 5% by mass have highly balanced workability, heat resistance, storage elastic modulus (G'), loss tangent (tan δ) and fracture strength as compared with the rubber compositions of Comparative Examples 1-6.

TABLE 4

|  |  |  | Comparative Example 7 | Comparative Example 8 | Example 8 | Example 9 | Example 10 | Example 11 | Example 12 | Comparative Example 9 | Comparative Example 10 |
|---|---|---|---|---|---|---|---|---|---|---|---|
| Type of low-molecular weight conjugated diene-based polymer (B) | | | — | B-1 BR | B-12 BR | B-3 BR | B-13 BR | B-4 BR | B-14 SBR | B-15 SBR | B-2 SBR |
|  | Weigh average molecular weight (×10³) | | — | 80 | 80 | 80 | 80 | 80 | 80 | 80 | 80 |
|  | Bound styrene content (% by mass) | | — | 0 | 0 | 0 | 0 | 0 | 0 | 3 | 7 | 20 |
|  | Vinyl bond content (%) | | — | 35 | 40 | 45 | 50 | 55 | 45 | 45 | 45 |
| Compounding | Rubber component (A) | NR *6 parts by mass | 60 | 60 | 60 | 60 | 60 | 60 | 60 | 60 | 60 |
|  |  | BR *7 | 40 | 40 | 40 | 40 | 40 | 40 | 40 | 40 | 40 |
|  |  | SBR1 *8 | — | — | — | — | — | — | — | — | — |
|  |  | SBR2 *9 | — | — | — | — | — | — | — | — | — |
|  | Low-molecular weight conjugated diene-based polymer (B) | | — | 10 | 10 | 10 | 10 | 10 | 10 | 10 | 10 |
|  | Aromatic oil | | 5 | 5 | 5 | 5 | 5 | 5 | 5 | 5 | 5 |
|  | Carbon black (N220) | | 60 | 60 | 60 | 60 | 60 | 60 | 60 | 60 | 60 |
|  | Stearic acid | | 1.5 | 1.5 | 1.5 | 1.5 | 1.5 | 1.5 | 1.5 | 1.5 | 1.5 |
|  | Zinc white | | 1.5 | 1.5 | 1.5 | 1.5 | 1.5 | 1.5 | 1.5 | 1.5 | 1.5 |
|  | Antioxidant 6C *10 | | 1 | 1 | 1 | 1 | 1 | 1 | 1 | 1 | 1 |
|  | Vulcanization accelerator DM *11 | | 0.2 | 0.2 | 0.2 | 0.2 | 0.2 | 0.2 | 0.2 | 0.2 | 0.2 |
|  | Vulcanization accelerator CZ *12 | | 0.5 | 0.5 | 0.5 | 0.5 | 0.5 | 0.5 | 0.5 | 0.5 | 0.5 |
|  | Sulfur | | 1 | 1 | 1 | 1 | 1 | 1 | 1 | 1 | 1 |
| Physical properties | Workability [ML$_{1+4}$ (130° C.)] (index) | | 100 | 91 | 91 | 92 | 91 | 91 | 90 | 91 | 90 |
|  | Loss tangent (tan δ) (index) | | 100 | 87 | 86 | 85 | 84 | 84 | 86 | 92 | 96 |
|  | Storage elastic modulus (G') (index) | | 100 | 114 | 113 | 115 | 117 | 118 | 114 | 114 | 116 |
|  | Heat resistance (vulcanization reversion) (index) | | 100 | 105 | 131 | 139 | 143 | 145 | 135 | 123 | 118 |
|  | Fracture strength (index) | | 100 | 102 | 125 | 130 | 136 | 137 | 131 | 102 | 91 |

TABLE 5

|  |  |  | Example 13 | Example 14 | Example 15 | Example 16 | Example 17 | Example 18 | Example 19 |
|---|---|---|---|---|---|---|---|---|---|
| Type of low-molecular weight conjugated diene-based polymer (B) | | | B-16 IR | B-8 BR | B-17 BR | B-9 BR | B-17 BR | B-17 BR | B-17 BR |
|  | Weigh average molecular weight (×10³) | | 80 | 40 | 100 | 120 | 100 | 100 | 100 |
|  | Bound styrene content (% by mass) | | 0 | 0 | 0 | 0 | 0 | 0 | 0 |
|  | Vinyl bond content (%) | | 45 | 45 | 45 | 45 | 45 | 45 | 45 |
| Compounding | Rubber (component A) | NR *6 parts by mass | 60 | 60 | 60 | 60 | 60 | 60 | 60 |
|  |  | BR *7 | 40 | 40 | 40 | 40 | 40 | 40 | 40 |
|  |  | SBR1 *8 | — | — | — | — | — | — | — |
|  |  | SBR2 *9 | — | — | — | — | — | — | — |

TABLE 5-continued

|  |  | Example 13 | Example 14 | Example 15 | Example 16 | Example 17 | Example 18 | Example 19 |
|---|---|---|---|---|---|---|---|---|
|  | Low-molecular weight conjugated diene-based polymer (B) | 10 | 10 | 10 | 10 | 5 | 40 | 50 |
|  | Aromatic oil | 5 | 5 | 5 | 5 | 5 | 5 | 5 |
|  | Carbon black (N220) | 60 | 60 | 60 | 60 | 60 | 60 | 60 |
|  | Stearic acid | 1.5 | 1.5 | 1.5 | 1.5 | 1.5 | 1.5 | 1.5 |
|  | Zinc white | 1.5 | 1.5 | 1.5 | 1.5 | 1.5 | 1.5 | 1.5 |
|  | Antioxidant 6C *10 | 1 | 1 | 1 | 1 | 1 | 1 | 1 |
|  | Vulcanization accelerator DM *11 | 0.2 | 0.2 | 0.2 | 0.2 | 0.2 | 0.2 | 0.2 |
|  | Vulcanization accelerator CZ *12 | 0.5 | 0.5 | 0.5 | 0.5 | 0.5 | 0.5 | 0.5 |
|  | Sulfur | 1 | 1 | 1 | 1 | 1 | 1 | 1 |
| Physical properties | Workability [ML$_{1+4}$ (130° C.)] (index) | 92 | 86 | 93 | 97 | 96 | 79 | 70 |
|  | Loss tangent (tan δ) (index) | 89 | 92 | 85 | 83 | 93 | 68 | 68 |
|  | Storage elastic modulus (G') (index) | 121 | 109 | 116 | 114 | 107 | 122 | 120 |
|  | Heat resistance (vulcanization reversion) (index) | 141 | 124 | 136 | 131 | 126 | 141 | 143 |
|  | Fracture strength (index) | 136 | 116 | 129 | 127 | 122 | 134 | 130 |

*6 Natural rubber, weight average molecular weight (Mw) as converted to polystyrene = 1,500,000.
*7 Polybutadiene rubber, BR01 manufactured by JSR Corporation, weight average molecular weight (Mw) as converted to polystyrene = 550,000.
*8 Styrene-butadiene copolymer rubber, SL 563 type manufactured by JSR Corporation, weight average molecular weight (Mw) as converted to polystyrene = 600 × 10$^3$, bound styrene content = 20% by mass, vinyl bond content = 55%.
*9 Styrene-butadiene copolymer rubber, T 0150 manufactured by JSR Corporation, weight average molecular weight (Mw) as converted to polystyrene = 900 × 10$^3$, bound styrene content = 45% by mass, vinyl bond content = 19%.
*10 N-(1,3-dimethylbutyl)-N'-phenyl-p-phenylenediamine.
*11 di-2-benzothiazolyl disulfide.
*12 N-cyclohexyl-2-benzothiazoly sulfenamide.

As seen from Tables 4-5, the rubber composition of Comparative Example 8 using the low-molecular weight conjugated diene-based polymer (B-1) having a vinyl bond content in a conjugated diene compound portion of less than 40% cannot obtain sufficient heat resistance and fracture strength. Also, the rubber compositions of Comparative Examples 9-10 using the low-molecular weight conjugated diene-based polymers (B-14)-(B-15) having a proportion of styrene units in total thereof of not less than 5% by mass cannot obtain sufficient heat resistance and fracture strength. Further, as seen from the comparison of Examples 15 and 17-19, the effects of improving the workability, heat resistance, storage elastic modulus (G'), loss tangent (tan δ) and fracture strength are dramatically improved by increasing the amount of the low-molecular weight conjugated diene-based polymer (B-7) compounded.

TABLE 6

|  |  |  | Comparative Example 11 | Example 20 | Comparative Example 12 | Example 21 | Comparative Example 13 | Example 22 | Comparative Example 14 | Example 23 |
|---|---|---|---|---|---|---|---|---|---|---|
| Type of low-molecular weight conjugated diene-based polymer (B) |  |  | — | B-17 | — | B-17 | — | B-17 | — | B-17 |
|  |  |  | — | BR | — | BR | — | BR | — | BR |
|  | Weigh average molecular weight (×10$^3$) |  | — | 100 | — | 100 | — | 100 | — | 100 |
|  | Bound styrene content (% by mass) |  | — | 0 | — | 0 | — | 0 | — | 0 |
|  | Vinyl bond content (%) |  | — | 45 | — | 45 | — | 45 | — | 45 |
| Bound styrene content in rubber component (A) (% by mass) |  |  | 14 | 14 | 18 | 18 | 29 | 29 | 36 | 36 |
| Compounding | Rubber component (A) | NR *6 parts | 30 | 30 | 10 | 10 | 35 | 35 | 20 | 20 |
|  |  | BR *7 by | — | — | — | — | — | — | — | — |
|  |  | SBR1 *8 mass | 70 | 70 | 90 | 90 | — | — | — | — |
|  |  | SBR2 *9 | — | — | — | — | 65 | 65 | 80 | 80 |
|  | Low-molecular weight conjugated diene-based polymer (B) |  | — | 10 | — | 10 | — | 10 | — | 10 |
|  | Aromatic oil |  | 5 | 5 | 5 | 5 | 5 | 5 | 5 | 5 |
|  | Carbon black (N220) |  | 60 | 60 | 60 | 60 | 60 | 60 | 60 | 60 |
|  | Stearic acid |  | 1.5 | 1.5 | 1.5 | 1.5 | 1.5 | 1.5 | 1.5 | 1.5 |
|  | Zinc white |  | 1.5 | 1.5 | 1.5 | 1.5 | 1.5 | 1.5 | 1.5 | 1.5 |
|  | Antioxidant 6C *10 |  | 1 | 1 | 1 | 1 | 1 | 1 | 1 | 1 |
|  | Vulcanization accelerator DM *11 |  | 0.2 | 0.2 | 0.2 | 0.2 | 0.2 | 0.2 | 0.2 | 0.2 |
|  | Vulcanization accelerator CZ *12 |  | 0.5 | 0.5 | 0.5 | 0.5 | 0.5 | 0.5 | 0.5 | 0.5 |
|  | Sulfur |  | 1 | 1 | 1 | 1 | 1 | 1 | 1 | 1 |
| Physical properties | Workability [ML$_{1+4}$ (130° C.)] (index) |  | 100 | 88 | 100 | 87 | 100 | 91 | 100 | 92 |
|  | Loss tangent (tan δ) (index) |  | 100 | 86 | 100 | 87 | 100 | 89 | 100 | 97 |
|  | Storage elastic modulus (G') (index) |  | 100 | 117 | 100 | 114 | 100 | 112 | 100 | 110 |

TABLE 6-continued

|  | Comparative Example 11 | Example 20 | Comparative Example 12 | Example 21 | Comparative Example 13 | Example 22 | Comparative Example 14 | Example 23 |
|---|---|---|---|---|---|---|---|---|
| Heat resistance (vulcanization reversion) (index) | 100 | 140 | 100 | 140 | 100 | 130 | 100 | 111 |
| Fracture strength (index) | 100 | 133 | 100 | 130 | 100 | 121 | 100 | 103 |

*6 Natural rubber, weight average molecular weight (Mw) as converted to polystyrene = 1,500,000.
*7 Polybutadiene rubber, BR01 manufactured by JSR Corporation, weight average molecular weight (Mw) as converted to polystyrene = 550,000.
*8 Styrene-butadiene copolymer rubber, SL 563 type manufactured by JSR Corporation, weight average molecular weight (Mw) as converted to polystyrene = 600 × $10^3$, bound styrene content = 20% by mass, vinyl bond content = 55%.
*9 Styrene-butadiene copolymer rubber, T 0150 manufactured by JSR Corporation, weight average molecular weight (Mw) as converted to polystyrene = 900 × $10^3$, bound styrene content = 45% by mass, vinyl bond content = 19%.
*10 N-(1,3-dimethylbutyl)-N'-phenyl-p-phenylenediamine.
*11 di-2-benzothiazolyl disulfide.
*12 N-cyclohexyl-2-benzothiazoly sulfenamide.

As seen from Table 6, the rubber compositions of Examples 20-23 formed by compounding the low-molecular weight conjugated diene-based polymer (B-17) into a rubber component (A) containing styrene units improve the workability, heat resistance, storage elastic modulus (G'), loss tangent (tan δ) and fracture strength as compared with the corresponding rubber compositions of Comparative Examples 11-14. Also, as seen from the results of Examples 20-23, when the proportion of styrene units in total of the rubber component (A) is less than 30% by mass, the workability, heat resistance, storage elastic modulus (G'), loss tangent (tan δ) and fracture strength of the rubber composition are dramatically improved.

The invention claimed is:

1. A rubber composition characterized by compounding 1-60 parts by mass of a low-molecular weight conjugated diene-based polymer (B) synthesized through an anionic polymerization and having a weight average molecular weight as measured through a gel permeation chromatography and converted to polystyrene of 40,000-200,000 and a vinyl bond content in a conjugated diene compound portion of not less than 55% based on 100 parts by mass of a rubber component (A) having a weight average molecular weight as measured through a gel permeation chromatography and converted to polystyrene of more than 200,000,
wherein the rubber component (A) comprises natural rubber and polybutadiene rubber,
an amount of the aromatic vinyl compound bonded in the low-molecular weight conjugated diene-based polymer (B) is less than 5% by mass;
wherein the rubber composition does not comprise polyisoprene rubber; and
wherein a proportion of styrene units in total of the rubber component (A) is less than 15% by mass.

2. A rubber composition according to claim 1, wherein the low-molecular weight conjugated diene-based polymer (B) has a weight average molecular weight as measured through a gel permeation chromatography and converted to polystyrene of 40,000-150,000.

3. A rubber composition according to claim 2, wherein the low-molecular weight conjugated diene-based polymer (B) has a weight average molecular weight as measured through a gel permeation chromatography and converted to polystyrene of 40,000-100,000.

4. A rubber composition according to claim 1, wherein the low-molecular weight conjugated diene-based polymer (B) is polybutadiene.

5. A rubber composition according to claim 4, wherein the low-molecular weight conjugated diene-based polymer (B) is polybutadiene having a weight average molecular weight as measured through a gel permeation chromatography and converted to polystyrene of 40,000-150,000.

6. A rubber composition according to claim 1, wherein carbon black or silica is further compounded.

7. A pneumatic tire characterized by using a rubber composition as claimed in claim 1 in a tread portion.

8. A pneumatic tire characterized by using a rubber composition as claimed in claim 1 in a sidewall portion.

9. A pneumatic tire characterized by using a rubber composition as claimed in claim 1 in at least any one of an innerliner, a ply-coating rubber and a bead filler.

* * * * *